United States Patent
Pouring et al.

(10) Patent No.: US 9,567,896 B2
(45) Date of Patent: Feb. 14, 2017

(54) METHOD FOR MODIFYING COMBUSTION CHAMBER IN A RECIPROCATING PISTON INTERNAL COMBUSTION ENGINE AND RESULTING ENGINE

(71) Applicant: SONEX RESEARCH, INC., Annapolis, MD (US)

(72) Inventors: Andrew Pouring, Edgewater, MD (US); Matthew Hayes, Tracy's Landing, MD (US); Brad Bopp, Stevensville, MD (US); Manfred Weber, Greensboro, MD (US); Michael Keller, Alexandria, VA (US)

(73) Assignee: SONEX RESEARCH, INC., Annapolis, MD (US)

( * ) Notice: Subject to any disclaimer, the term of this patent is extended or adjusted under 35 U.S.C. 154(b) by 394 days.

(21) Appl. No.: 14/166,654

(22) Filed: Jan. 28, 2014

(65) Prior Publication Data

US 2014/0209057 A1    Jul. 31, 2014

Related U.S. Application Data

(60) Provisional application No. 61/757,379, filed on Jan. 28, 2013.

(51) Int. Cl.
*F02F 1/00* (2006.01)
*F02B 19/10* (2006.01)
(Continued)

(52) U.S. Cl.
CPC ....... *F02B 19/1023* (2013.01); *F02B 19/1009* (2013.01); *F02B 19/12* (2013.01);
(Continued)

(58) Field of Classification Search
CPC ...... F02F 1/24; F02B 23/00; F02B 2013/0609
(Continued)

(56) References Cited

U.S. PATENT DOCUMENTS

| 2,148,357 A | 2/1939 | Johnson |
|---|---|---|
| 2,514,287 A | 7/1950 | Mueller |

(Continued)

FOREIGN PATENT DOCUMENTS

| EP | 0 120 223 A2 | 10/1984 |
|---|---|---|
| GB | 911125 A | 11/1962 |
| WO | 2009114327 A1 | 9/2009 |

OTHER PUBLICATIONS

International Search Report and Written Opinion of the International Searching Authority regarding International Application No. PCT/US2014/013432, mailed May 21, 2014.
(Continued)

*Primary Examiner* — John Kwon
(74) *Attorney, Agent, or Firm* — Workman Nydegger

(57) ABSTRACT

A method for improving combustion in a main combustion chamber of an internal combustion engine and a resulting engine are disclosed. The engine includes a main combustion chamber arranged between a head and a reciprocating piston. A heat retaining element is provided between the head and the main combustion chamber. The heat retaining element is configured to reduce heat transfer from the main combustion chamber into the engine head. A precombustion chamber is provided having a reaction chamber. The reaction chamber is configured to be provided with a secondary charge of air/fuel and a first spark igniter.

20 Claims, 7 Drawing Sheets

(51) Int. Cl.

| | | |
|---|---|---|
| *F02B 19/12* | (2006.01) | |
| *F02M 21/02* | (2006.01) | |
| *F02B 23/08* | (2006.01) | |
| *F02B 43/04* | (2006.01) | |
| *F02B 25/14* | (2006.01) | |
| *F02B 75/02* | (2006.01) | |

(52) U.S. Cl.
CPC ......... *F02B 23/08* (2013.01); *F02M 21/0215* (2013.01); *F02M 21/0275* (2013.01); *F02B 19/108* (2013.01); *F02B 25/14* (2013.01); *F02B 43/04* (2013.01); *F02B 2023/085* (2013.01); *F02B 2075/025* (2013.01); *Y02T 10/125* (2013.01); *Y02T 10/32* (2013.01)

(58) Field of Classification Search
USPC ....... 123/193.1, 193.3, 195.5, 668, 669, 671
See application file for complete search history.

(56) References Cited

U.S. PATENT DOCUMENTS

| | | | |
|---|---|---|---|
| 2,917,226 A | 12/1959 | Scheiterlein | |
| 3,092,088 A | 6/1963 | Goossak et al. | |
| 3,115,127 A | 12/1963 | Spencer et al. | |
| 3,230,939 A | 1/1966 | Goossak | |
| 3,283,751 A | 11/1966 | Goossak et al. | |
| 4,091,772 A | 5/1978 | Heater et al. | |
| 4,519,359 A | 5/1985 | Dworak et al. | |
| 4,561,406 A * | 12/1985 | Ward | F02B 23/08 |
| | | | 123/143 B |
| 4,592,318 A | 6/1986 | Pouring | |
| 4,592,331 A | 6/1986 | Pouring | |
| 4,681,072 A | 7/1987 | Pouring | |
| 4,738,227 A * | 4/1988 | Kamo | F02B 9/04 |
| | | | 123/23 |
| 4,788,942 A | 12/1988 | Pouring et al. | |
| 4,827,887 A | 5/1989 | Leshner | |
| 4,898,135 A | 2/1990 | Failla et al. | |
| 4,998,517 A * | 3/1991 | Kawamura | F02B 19/165 |
| | | | 123/270 |
| 5,010,861 A * | 4/1991 | Matsuoka | F02B 19/165 |
| | | | 123/254 |
| 5,052,356 A | 10/1991 | Blaser | |
| 5,095,869 A | 3/1992 | Blaser et al. | |
| 5,117,788 A | 6/1992 | Blaser | |
| 5,239,956 A * | 8/1993 | Keelan | B22C 1/00 |
| | | | 123/193.5 |
| 5,277,159 A * | 1/1994 | Webster | F02B 19/04 |
| | | | 123/254 |
| 5,322,042 A | 6/1994 | Di Priolo et al. | |
| 5,730,096 A | 3/1998 | Atmur et al. | |
| 5,855,192 A | 1/1999 | McCowan | |
| 5,862,788 A | 1/1999 | Pouring et al. | |
| 6,178,942 B1 | 1/2001 | Di Priolo et al. | |
| 6,354,260 B1 | 3/2002 | Newsom et al. | |
| 8,567,369 B2 | 10/2013 | Johnson | |
| 8,857,405 B2 | 10/2014 | Attard | |
| 2004/0237629 A1* | 12/2004 | Lenzing | G01L 9/0077 |
| | | | 73/35.12 |
| 2010/0319655 A1 | 12/2010 | McClendon | |
| 2011/0232589 A1 | 9/2011 | Blank | |
| 2012/0103302 A1 | 5/2012 | Attard | |
| 2012/0118262 A1 | 5/2012 | Johnson | |

OTHER PUBLICATIONS

David A. Blank, SAE Paper 2011-26-0005 "NOx Reduction in Natural Gas RI Species Augmented Large Bore Four-Stroke SI Engines", 1-16, 2011, SAE International.

David A Blank, SAE Paper 2011-01-1895 "Combustion Control Chemical-Kinetics Studies with Natural Gas in HCRI Enhanced Four-Stroke DI SI", p. 1-15, 2011, Society of Automotive Engineers of Japan, Japan.

David A Blank, SAE Paper 2011-01-2025 "A Novel Two-Stroke SI Design for NOx Reduction in Natural Gas RI Species Enhanced Engine", p. 1-15, 2011, Society of Automotive Engineers of Japan, Japan.

"An ASME Historic Mechanical Engineering Landmark," ASME History and Heritage Committee; Aug. 26, 2006.

Bourn, Gary D., et al. "Advanced Compressor Engine Controls to Enhance Operation, Reliability, and Integrity" Southwest Research Institute, San Antonio, TX, USA, per Doe Award No. DE-FC26-03NT41859, SwRi Project No. 03.10198, Mar. 2004.

Engines and Energy Conversion Lab et al. "ERLE Cost Study of the Retrofit Legacy Pipeline Engines to Satisfy 1/2 g/BHP-HR NOx," Rev.1, May 21, 2009.

* cited by examiner

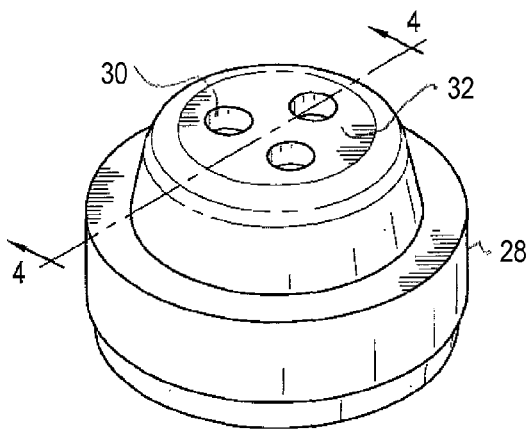
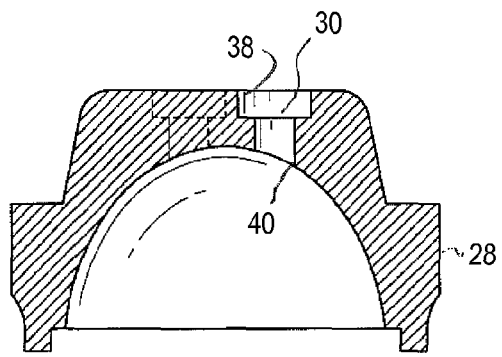
FIG. 3  FIG. 4
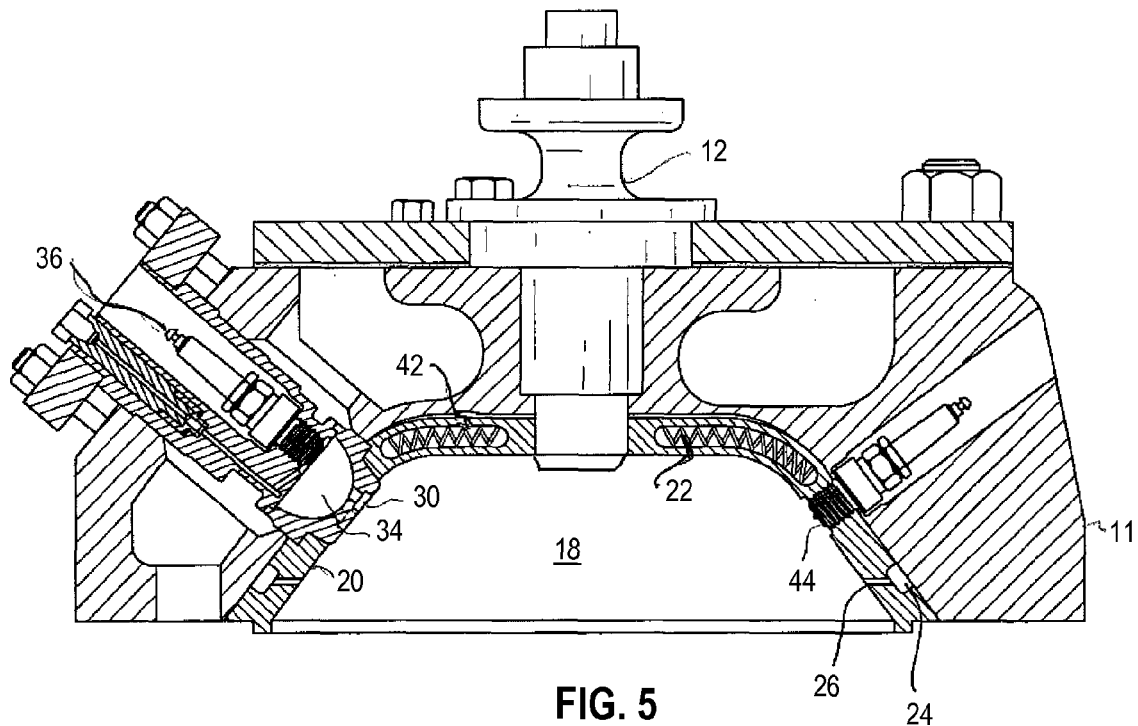
FIG. 5

METHOD FOR MODIFYING COMBUSTION CHAMBER IN A RECIPROCATING PISTON INTERNAL COMBUSTION ENGINE AND RESULTING ENGINE

FIELD

The present disclosure relates generally to the field of reciprocating piston engines, and more particularly relates to combustion chamber modifications and charge ignition modifications that result in improved combustion in existing reciprocating piston, internal combustion engines, particularly such engines operating at lean-burn conditions.

BACKGROUND

Large, stationary, so-called "legacy" natural gas fuel burning, reciprocating piston, combination or integrated internal combustion engines and compressors driven by such engines have been used to pump natural gas through distribution pipelines for more than 100 years following conversion of such compressor engines to burn natural gas fuels instead of liquid fuels or steam.

Some layouts of such combination engine-compressors can be observed in patents to Mueller U.S. Pat. No. 2,514,287; Scheiterlein U.S. Pat. No. 2,917,226; and Heater et al. U.S. Pat. No. 4,091,772. More recent examples of the combustion chamber arrangement of such engines can be observed in pending U.S. patent application publication US 2010/0319655 of McClendon. Additional description of the legacy engines can be found in the report sponsored by Engines and Energy Conversion Lab entitled "ERLE Cost Study of the Retrofit Legacy Pipeline Engines to Satisfy 1/2 g/BHP-HR NOx", Rev. 1, May 21, 2009, involving a study performed by Engines and Energy Conversion Lab, National Gas Machinery Laboratory (An Institute of Kansas State University), Advance Technology Corporation and Hoerbiger.

A further review of legacy Cooper-Bessemer Type GMV Integral-Angle Gas Engine-Compressors may be found at "An ASME Historic Mechanical Engineering Landmark" published by the ASME History and Heritage Committee in August 2006 for Knox County Historical Museum, Mount Vernon, Ohio. Another publication describing such engines may be observed in Bourn, Gingrich, and Smith's "Advanced Compressor Engine Controls to Enhance Operation, Reliability and Integrity", Southwest Research Institute, San Antonio, Tex., USA, per Doe Award No. DE-FC26-03NT41859, SwRi Project No. 03.10198, March 2004.

Legacy engines of the type discussed above have served well and continue in service up to the present time. On the other hand, they still suffer from certain disadvantages that have required further study and research to overcome. To name a few such disadvantages, the engines are prone to be difficult to start when cold; run roughly when cold, with mechanical stresses imposed on moving parts such as pistons and bearings and with preignition events that damage spark igniters; run with relatively high variation of peak firing pressure and variation of timing of peak firing pressures of combustion cycles; emit excess NOx, unburned hydrocarbons and excess CO; and run at efficiencies that are less than theoretically possible due to compromises imposed on the operating conditions of the engines.

Thus, a review of reciprocating piston, internal combustion engine art reveals various attempts to improve lean-burn combustion in the combustion chamber of such engines by utilizing prechambers to initiate a torch-like output to cause ignition in lean-burn fuel-air mixtures.

There is thus a need for improved combustion chamber design for such engines to overcome or avoid the described disadvantages and to bring the emissions of the engines into line with modern emission standards. Obtaining such improvements, however, must not come at a cost of excess downtime for the engines, which operate around the clock, or major modifications of the engine components which would require costly and lengthy trials and research to prove feasibility and demonstrate successful results. Such engines are no longer manufactured, and repair and overhauling of the engine often require manufacturing parts to replace worn out elements and components that are no longer readily available.

SUMMARY

A method for improving combustion in a main combustion chamber of an internal combustion engine and a resulting engine are provided. The engine includes a main combustion chamber arranged between a head and a reciprocating piston. A heat retaining element is provided between the head and the main combustion chamber. The heat retaining element is configured to reduce heat transfer from the main combustion chamber into the engine head. A precombustion chamber is provided, which includes a reaction chamber. The reaction chamber is configured to be provided with a secondary charge of air/fuel and a first spark igniter. The reaction chamber communicates with the main combustion chamber via a plurality of discharge channels configured to discharge fuel radical species from the reaction chamber into the main combustion chamber. The fuel radical species is generated from the secondary charge. The heat retaining element is a self-supporting structure coupled to the head. The heat retaining element includes a head-facing portion substantially corresponding in shape to a portion of the head facing the main combustion chamber.

The objective of the disclosed concept is to provide a scheme for redesigning the main combustion chamber of legacy engines such as described above involving only modifying the head of the engine and part of the combustion chamber in the head area by using simple solutions involving changing and adding components to the engine head area that lead to avoidance of the disadvantages discussed above and improvement of operating smoothness and efficiency of the engines.

Proposed is the substitution of a Goossak-type pre-combustion radical producing reaction chamber and ignition system with a main combustion chamber regenerative heat retainer element or system for the gas jet igniter arrangement currently used in the head of the internal combustion engine of legacy engines and similar engines using the same fuel and ignition technology.

The numerous other advantages, features and functions of embodiments of a method for improving start-up and operating combustion in a main combustion chamber of a reciprocating piston internal combustion engine and embodiments of a resulting improved engine will become readily apparent and better understood in view of the following description and accompanying drawings. The following description is not intended to limit the scope of the method for improving start-up and operating combustion in a main combustion chamber of a reciprocating piston internal combustion engine and embodiments of a resulting improved engine, but instead merely provides exemplary embodiments for ease of understanding.

A feature of the embodiments and examples described herein includes a method of improving start-up and operating lean-burn combustion in a main combustion chamber of a reciprocating piston, internal combustion engine having, for example, a main block and a fluid-cooled head, such combustion chamber being as defined by a variable volume above each engine piston, wherein the following steps are provided:

(a) a heat retaining element distinct from the engine main block and head located within the head of the engine is provided that retains heat of combustion of each combustion cycle for transfer to charge of a subsequent combustion cycle;

(b) the heat retaining element is installed in the head as a self-supporting structure having a head-facing portion having a shape substantially corresponding to the shape of that portion of the main combustion chamber defined by the head with a clearance gap between at least the head-facing portion and the head before engine operation, with the size of the clearance gap being arranged to be varied in dependence on temperature of the heat retainer after engine start-up, so that the heat transfer rate between the heat transfer element and the head is varied as a function of the size of the clearance gap during engine operation to optimize the rise in temperature of a layer of fuel-air in contact with the heat retaining element during the latter stage of the compression stroke.

The size of the clearance gap of step (b) is varied by using natural thermal expansion and contraction of the heater retainer within the head during engine operation. The gap may be reduced down to zero during engine operation to effectively cause increased heat transfer between the heat retainer and the head under engine operation conditions that cause high heating of the heat retainer while maintaining the ability to transfer heat to a layer of fuel-air in contact with the element.

The engine head and heat retainer have respectively a head and heat retainer thermal diffusivity, a head and heat retainer thermal capacity, and a head and heat retainer heat transfer coefficient. The heat retainer is constructed from a material that has at least one of: a lower heat retainer thermal diffusivity than the head thermal diffusivity, a heat retainer heat capacity greater than the head heat capacity, and a heat retainer heat transfer coefficient lower than the head heat transfer coefficient. The engine that is suitable for use of the present disclosure may be a fluid-cooled, two-stroke, direct injected, natural gas fuel lean burning, engine that in one configuration preferably includes at the head of the engine a precombustion chamber having a volume, with the precombustion chamber being provided with a spark igniter within the precombustion chamber volume, and receiving a charge of secondary air/fuel each combustion cycle of the engine.

The current precombustion chamber and flame torch igniter in the engines uses a spark ignited precombustion chamber supplied with a rich volume of igniter gas that is fired in timed relationship with the main combustion chamber combustion cycle, to cause a jet stream or "torch" of hot burning fuel to be injected into the main combustion chamber to which a main charge has been admitted to ignite the main charge for each combustion event. The torch igniter arrangement is needed primarily due to the lean burn conditions in the main combustion chamber and the other conditions within the main combustion chamber.

The current precombustion chamber and gas torch igniter is modified by removing the nozzle end of the igniter and substituting for same a Goossak type reaction chamber with an end cap providing multiple discharge orifices with sharp entry and exit edges, defined lengths, and defined sizes for the orifices, in combination with using a defined ratio of reaction chamber volume to main combustion chamber volume, a defined reaction chamber air/fuel mixture, a defined main combustion air/fuel mixture, and a defined pressure differential between the reaction chamber and the main combustion chamber.

Optionally, a spark igniter in the main combustion chamber and an auxiliary electrical heater may be used in the modification of the basic cylinder head.

The regenerative heat retaining element or system in the main combustion chamber may be a coating, solid element, or other device located in the modified head end of the combustion chamber only, with adequate sealing between the combustion chamber and fuel injector, reaction chamber orifice cap, spark igniter and other objects in communication with the main combustion chamber. Assuming the material of the head 11 has a defined thermal diffusivity, thermal capacity and heat transfer coefficient, the material of the regenerative heat retainer 20 will be selected to have one or more of a lower thermal diffusivity a (sq. ft./hr), higher thermal capacity Cp×p (Btu/ft3 F) and lower heat transfer coefficient k (Btu/hr ft. F) than the head 11. An electrical heater arrangement may be imbedded into the heat retainer or the head of the engine for adding heat to strategic areas of the main combustion chamber.

Obtained is a more stable and reliable ignition timing and charge firing, a more stable yet shorter combustion event, lower combustion temperatures with reduced NOx, improved coefficient of variation (COV) expressed as standard deviation of peak firing pressure (PFP) from combustion event to combustion event each combustion cycle, as well as location of PFP, lower carbon monoxide (CO) emission and improved specific fuel consumption (SFC), all without sacrificing power, and likely improving power.

In accordance with an exemplary version of the invention, a method is proposed for improving start-up and operating combustion in a main combustion chamber of a water-cooled, two-stroke, direct fuel injected, natural gas fuel burning, reciprocating piston internal combustion engine that normally includes within a head of the engine a precombustion chamber having a volume, the precombustion chamber being provided with a charge of secondary air/fuel and a first spark igniter within the precombustion chamber volume, the precombustion chamber volume communicating with the main combustion chamber via a jet orifice through which a burning flame torch or jet of ignited secondary charge is discharged into the main charge that has been or is being compressed each combustion cycle of the engine to ignite each main charge in the main combustion chamber, and optionally having a second spark igniter in the main combustion chamber at least to facilitate start-up of the engine, by:

modifying the precombustion chamber by substituting a reaction chamber and a plurality of flame quenching reaction chamber discharge channels for the jet orifice, the reaction chamber channels being provided in an end cap closing the reaction chamber and having diameters, sharp entry and exit edges, lengths that are 0.9 to 1.6 times the channel diameters and that quench flame fronts in both entry and exit directions, a total combined cross-section area that is 0.02 to 0.03 times the volume of the main combustion chamber at minimum volume Vmin (with the piston at top dead center (TDC));

configuring the volume of the reaction chamber so that it is 2-3% of the volume of the main combustion chamber at TDC, operating the engine using high energy radicals of spark-ignited, partially combusted, secondary charge generated in the reaction chamber and discharged flamelessly through the discharge channels, each combustion cycle to cause timed auto ignition of each main charge after engine start-up;

providing a regenerative heat retainer element apart from the engine structure and second spark igniter within the head of the engine that retains heat of combustion of each combustion cycle for transfer to the main incoming charge in the next combustion cycle by slowing heat transfer from the main combustion chamber into the engine structure;

optionally providing an auxiliary heat source apart from the second spark igniter in the head area of the engine and operating the auxiliary heat source to heat each main charge, each combustion cycle of the engine at least during engine start-up and cold running conditions; and operating the engine with excess air/fuel ratio (Lambda) in the main combustion chamber equal to 1.0 to 2.0.

Structurally, the flame quenching channels are provided in an end cap that, apart from the channels, closes communication between the reaction chamber and the main combustion chamber. The end cap is also configured to have an interior volume corresponding substantially to the desired volume of the reaction chamber designed in accordance with production or radical fuel species. Using the basic structure of the original precombustion igniter assembly of the existing engines and cutting off the end of the existing igniter and substituting a cap with discharge orifices therefore enables modification of the combustion chamber at minimum cost and complexity. The outside configuration of the existing igniter, apart from the cap, corresponds with the configuration of the existing igniter, so that the new reaction chamber and cap can simply be substituted for the existing igniter without modifying the head of the engine or the block of same.

The second spark igniter may be connected directly to the heat retainer element to cause heat transfer from the second spark igniter to the heat retainer element. The heat retainer element may be fitted in the engine head with a clearance air gap between the heat retainer element and the head before engine start-up, with the size of the gap arranged to be varied in dependence on main combustion chamber temperature after engine start-up due to expansion and contraction of the heat retainer element, so that the heat transfer rate between the heat retainer element and the head is varied as a function of the size of the air gap, which may be reduced to zero under some engine operating conditions.

At least one auxiliary micro-chamber closely adjacent to and heated by the main combustion chamber may be provided, such micro chamber communicating with the main combustion chamber via at least one micro chamber passage and receiving heated products of combustion during each combustion cycle via the micro chamber passage, and through which is discharge hot radicals derived from the products of combustion into the main combustion chamber during each subsequent intake event of each combustion cycle of the engine to thereby seed each fresh main charge with the radicals after a first combustion cycle of the engine.

The numerous other advantages, features and functions of embodiments of a method for improving start-up and operating combustion in a main combustion chamber of a reciprocating piston internal combustion engine and embodiments of a resulting improved engine will become readily apparent and better understood in view of the following description and accompanying drawings. The following description is not intended to limit the scope of the method for improving start-up and operating combustion in a main combustion chamber of a reciprocating piston internal combustion engine and embodiments of a resulting improved engine, but instead merely provides exemplary embodiments for ease of understanding.

Another aspect of the disclosure is an internal combustion engine adapted to use the above-described process, the engine including a block, one or more reciprocating pistons in the block, a fluid-cooled head, a main combustion chamber defined by the block and the head above each piston, each main combustion chamber portion defined by the head having a selected head chamber shape, and the described heat retainer preferably comprising in one embodiment, specifically a self-supporting structure secured in the head between the head and each respective piston, the heat retainer having at least a front surface facing towards a respective piston and a rear surface that faces the head and a least in part conforms substantially with the head chamber shape, at least a portion of the rear surface spaced from the head to define a gap before engine operation.

The heat retainer preferably is formed of a material and is configured so that the heat retainer expands as a function of combustion heat during engine operation to reduce the gap and thereby increase at least a rate of heat transfer between the heat retainer and the water-cooled head as a function of combustion heat during engine operation. The gap reduction in such engine may extend to zero. The head and heat retainer preferably also have respectively a head and heat retainer thermal diffusivity, a head and heat retainer thermal capacity, and a head and heat retainer heat transfer coefficient, with the heat retainer being constructed of a material that has at least one of: a lower heat retainer thermal diffusivity than the head thermal diffusivity, a heat retainer heat capacity greater than the head heat capacity, and a heat retainer heat transfer coefficient lower than the head heat transfer coefficient.

The heat retainer in the afore described configurations creates what may be termed a "thermally stratified regenerative combustion chamber" in the sense that the heat retainer transmits or conducts heat of combustion from each combustion cycle into the engine block and head in different manners and rates, with lower temperatures occurring near the intersection of the head and block of the engine, or near the lower part of the combustion chamber, with higher temperatures occurring at the mid and top part of the heat retainer that may be spaced from the cooled head of the engine, at least until the heat retainer has expanded into contact with the head, at which point the separation gap would be zero. The mid and top part of the combustion chamber thus would function at a higher temperature than the lower part of the combustion chamber. The engine designer is thereby provided with a design tool to adjust the operating temperature of the combustion chamber to influence the characteristics of the lean-burn by designing the heat retaining element, including the material constituting the heat retaining element, and the gap in a manner that can produce a customized thermally stratified regenerative combustion chamber which will be useful to control lean-burn combustion events within the combustion cycle of the engine.

In the engine, a spark igniter may be provided in each main combustion chamber as afore described preferably connected directly to the heat retainer. The engine contemplated, moreover, will be a reciprocating piston, water-cooled, two-stroke, direct injected, natural gas fuel lean burning engine that normally includes at the head of the engine adjacent each main combustion chamber a precombustion chamber having a volume, the precombustion chamber being arranged to receive in the volume a charge of secondary air/fuel during each combustion cycle of the engine, a spark igniter in the precombustion chamber arranged to be cyclically ignited in timed relationship with the combustion cycle of the engine. The precombustion chamber will communicate with a respective main combustion chamber via one or more jet orifices or ports through which a burning flame jet of secondary charge ignited by the spark igniter or high energy radicals resulting from partial combustion of the secondary charge in the precombustion chamber is periodically discharged into the main charge that has been or is being compressed each combustion cycle of the engine to ignite each main lean charge in the main combustion chamber.

The numerous other advantages, features, and functions of embodiments of a method for improving start-up and operating combustion in a main combustion chamber of a reciprocating piston internal combustion engine and embodiments of a resulting improved engine will become readily apparent and better understood in view of the following description and accompanying drawings. The following description is not intended to limit the scope of the method for modifying or resulting modified engine and the components thereof, but instead merely provides exemplary embodiments for ease of understanding.

BRIEF DESCRIPTION OF THE DRAWINGS

These and other features, aspects, and advantages of the present disclosure will become better understood with regard to the following description, appended claims, and accompanying drawings where:

FIGS. 3 and 4 show a perspective and cross-section view taken along line 4-4, respectively, a reaction chamber cap with discharge channels or orifices.

FIG. 5 shows a variation of the combustion chamber of FIG. 2.

Figure 1:
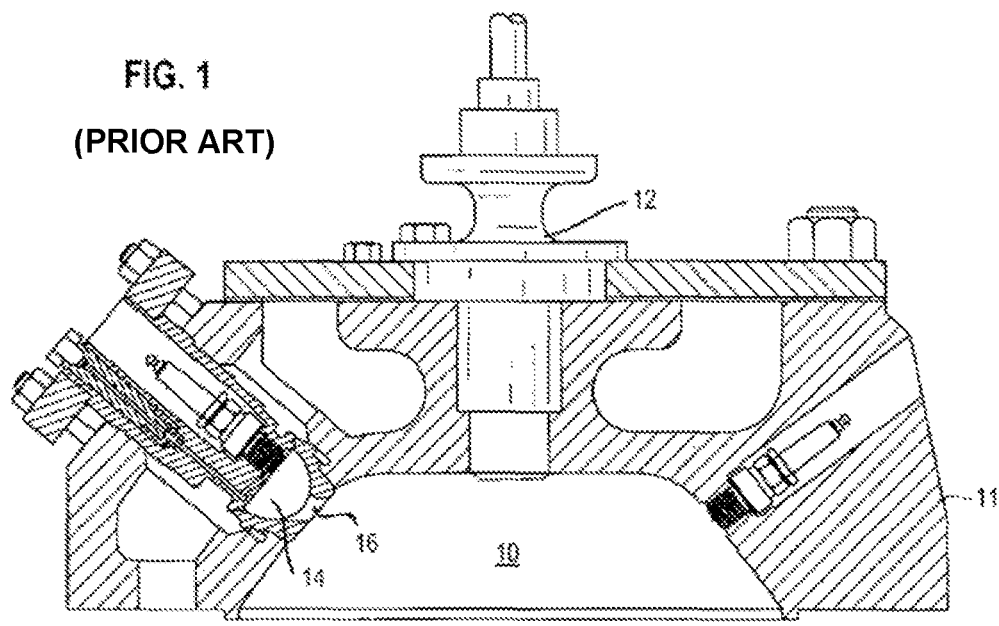
FIG. 1. is a schematic cross-section view in elevation of a prior art combustion chamber of a reciprocating piston I.C. engine with an exemplary surrounding head area of the engine.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of method for modifying or resulting modified engine and the components thereof, and in no way limit the structures or configurations of the method for modifying or resulting modified engine and the components thereof according to the present disclosure.

DETAILED DESCRIPTION

With reference to FIG. 1, there is illustrated schematically an existing combustion chamber 10 in a water-cooled head structure 11 of a known engine, specifically an integrated engine-compressor engine of the legacy variety originally made by the Cooper-Bessemer Company used to pump natural gas through distribution pipelines, such engines being described in the Background section above. The upper block portion of such an engine is illustrated and described in published international patent application number PCT/US2009/035771 published as WO 2009/114327 A1, and U.S. patent application publication number US 2012/0118262 A1, which are incorporated herein by reference for a description of the upper block structure and basic head arrangement of such engine.

The legacy Cooper-Bessemer legacy engine is a large displacement, two-stroke, natural gas burning, turbocharged engine in which the air of each charge is supplied by air inlet ports (not shown) that are opened when the piston approaches its bottom position, and the gas fuel is directly injected into the combustion chamber by a fuel injector 12 located at the top area of the combustion chamber 10. Exhaust of combustion products is through exhaust outlet ports (not shown) also located in the cylinder wall adjacent the bottom position of the piston. Ignition of each air/fuel charge is accomplished by using a precombustion chamber 14 to ignite a smaller rich charge mixture that is discharged via jet orifice 16 into the main combustion chamber 10 in the manner of a jet flame or torch to ignite a charge already admitted into the main combustion chamber 10.

The precombustion chamber 14 and torch ignition scheme are needed because in such engines the combustion takes place under lean burn conditions where another ignition means such as a spark igniter would not ignite each charge dependably, resulting in inefficient operation and undesired exhaust emissions. Also, because of the burning characteristics of natural gas fuel, the temperature of the combustion chamber of such engines tends to be lower than optimum for stable, uniform ignition and combustion, resulting in cold starting and running conditions that produce mechanical stresses and undesirable exhaust emissions and variations in peak firing pressure timing. Such legacy engines also operate at high horsepower output ratings at relatively low RPM in the 300-500 range, at compression ratios of 4-8 to one, which further creates challenges to optimize combustion in terms of stable, uniform peak firing pressure and timing, exhaust emissions, cold start running and overall smooth operation. Due to the operating conditions, power output usually must be compromised to limit emissions or otherwise cause the engine to run at best available power.

The present invention has for an objective to modify such existing combustion chambers in a simple, effective manner not requiring complete tear-down of the engine, using the existing head structure and fuel delivery system to improve combustion characteristics of the engine and reduce undesirable emissions, such a CO and NOx.

Figure 2:
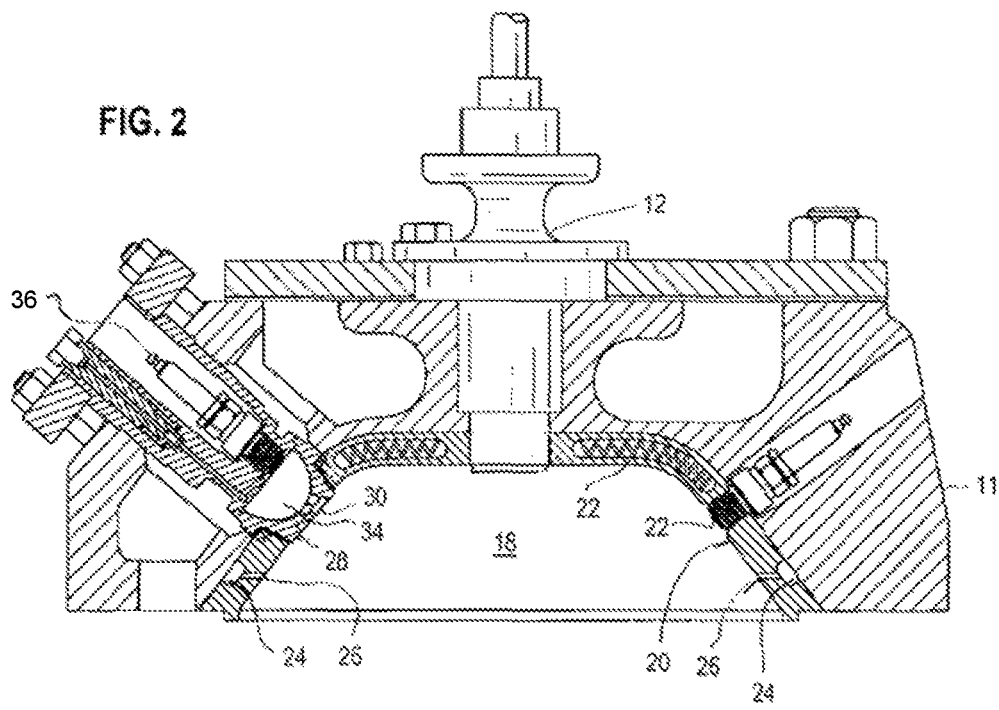
FIG. 2 shows the combustion chamber of FIG. 1 with various elements implementing the present invention.

Specifically, an exemplary modification or conversion in accordance with an embodiment of the invention is shown in FIG. 2, where the modified main combustion chamber 18 is provided with a solid, fitted regenerative heat retainer 20 in the form of self-supporting shaped insert that is provided in close-fitting relationship within the existing head combustion chamber structure 11 above the piston of the engine in each cylinder of the engine to define the modified combustion chamber 18 between the heat retainer and the piston below. The heat retainer 20 will be formed of a material that will have the desired thermal properties needed to heat each new incoming charge of air/fuel by using the heat of combustion of the previous charge after the first combustion event. Specifically, assuming the material of the head 11 has a defined thermal diffusivity, thermal capacity and heat transfer coefficient, the material of the regenerative heat retainer 20 will be selected to have one or more of a lower thermal diffusivity, higher thermal capacity and lower heat transfer coefficient than the head 11.

For example, assuming the head 11 to be made of cast iron, the heat retainer could be made of aluminum. With the thermal properties of aluminum, each new charge after the first will be heated to a higher degree before ignition than the charges admitted to the existing prior art combustion chamber 10, given the high heat retention properties of aluminum. Heat retainers made of other appropriate materials could be used provided the heat retention and transfer properties of the heat retainer maintain the heat of combustion of the main combustion chamber to the desired degree to achieve the advantages of the invention.

As shown in FIG. 2, an auxiliary electrical heater element 22 may be imbedded in the heat retainer 20 to add heat to the combustion chamber 18 during cold start conditions to facilitate easier ignition and smooth running of the engine during warm-up and steady state operation. An appropriated control and power supply (not shown) would be provided for the heating element 22. Optionally, the heater may be provided within the head adjacent the combustion chamber.

In addition, micro chambers 24 could be provided around the inner periphery of the heat retainer 20 with micro chamber passages 26 providing communication between the combustion chamber 18 and the micro chambers 24 in accordance with the micro chamber designs described in U.S. Pat. Nos. 5,322,042; 5,862,788 and 6,178,942, which are incorporated herein by reference. The micro chambers provide fuel radicals for enhancing auto-ignition of the charges admitted into the combustion chamber 18 and otherwise provide the benefits described in the above-mentioned U.S. patents. Notably, the location of the micro chamber passages 26 in the heat retainer 20 advantageously avoids the need to modify the head or pistons of the existing engine being modified to provide the micro chambers.

For the further possible improvement of the existing engine, the precombustion chamber 14 shown in FIG. 1 is modified by using instead a reaction chamber for generating fuel radical species and replacing the end thereof having the jet orifice 16 with a new reaction chamber cap element 28 that is shown in more detail in FIGS. 4 and 5. The cap element 28 includes discharge channels 30 in an otherwise closed end wall 32. The radical producing reaction chamber 34 is substituted for the prior art precombustion chamber 14 and the precombustion chamber spark igniter 36 is provided to initiate partial combustion reaction of separate fuel supplied to the reaction chamber 34 in timed relationship with the combustion cycle of the main combustion chamber 18. As described above, preferably the existing igniter is replaced by the inventive reaction chamber that is configure to fit precisely where the prior igniter was located, using the same connection arrangement, e.g., a threaded connection, as the igniter. The newly added cap 28 on the reaction chamber provides the desired discharge orifices for the fuel radical species generated in the reaction chamber 34 with minimum alteration of the basic head structure of the existing engine.

The principle of operation of the reaction chamber 34 is in accordance with principles described in the patent of Mallory U.S. Pat. No. 2,148,357 and patents of Goossak GB 911,125 (1962), U.S. Pat. No. 3,092,088; U.S. Pat. No. 3,230,939, and U.S. Pat. No. 3,283,751 as modified in accordance with the description above of the inventive reaction chamber and discharge orifices. Also, reference is made to the U.S. patent to Failla et al. U.S. Pat. No. 4,898,135 for a further description of the principles of operation of the reaction chamber 34. All of the aforementioned patents are incorporated herein by reference.

For an exemplary engine provided with the modified main combustion chamber 18 having a defined main combustion chamber volume Vmin at piston top dead center (TDC) position, an exemplary reaction chamber may have a volume of 2-3% of the main combustion chamber volume Vmin. The channels 30 would have sharp entry and exit edges 38, 40, respectively, and be configured to quench any flame attempting to propagate through the cap discharge channels 30 by having lengths that are 0.9 to 1.6 times the diameters of the channels 30. The combined total cross-sectional area of the cap discharge channels would be 0.02 to 0.03 times the volume Vmin of the modified combustion chamber 18.

Ignition of the charge in the modified main combustion chamber 18 would be produced by first igniting a relatively rich air/fuel charge (e.g., Lambda of 0.4 to 0.7) in the reaction chamber using the reaction chamber spark igniter 36 in timed relationship with the combustion cycle in the main combustion chamber 18, thereby causing discharge of high energy fuel radicals out of the cap discharge channels 30 into the main combustion chamber 18 which react with a relatively lean air/fuel mixture in the main combustion chamber 18 (Lambda 1.0 to 2.0) to cause autoignition of the charge in accordance with the known principles of radical induced ignition as described in the aforementioned patents.

The use of radicals instead of the flame torch principle of the prior art described above enables improved quality and timing of ignition of relatively lean charge mixtures in the main combustion chamber 18, smoother burning of the charge, ignition of the charge at lower temperature due to leaner conditions, reduction of coefficient of variation (COV) of peak firing pressure (PFP); reduction of location (timing-wise) of the PFP; and reduction of specific fuel consumption (SFC) vs. NOx trade-off as compared with spark or flame ignition (flame front ignition).

The heat retainer 20 may be installed in the modified combustion chamber 18 with a defined air gap 42 (see FIG. 5) between the top side of the heat retainer 20 and the adjacent upper side of the existing head structure 11. The gap further impedes heat transfer between the heat retainer 20 but the heat transfer will be varied as a function of the heat of the combustion chamber 18 and the temperature of the heat retainer 20 due to expansion of the heat retainer 20 during engine operation that effectively reduces the size of the gap 42 theoretically down to zero. As the heat retainer 20 expands against the upper head structure 11, of course the heat retainer will be cooled at that region, causing the heat retainer to contract to re-establish the gap 42, thereby providing a self regulating effect on the temperature of the heat retainer 20 in dependence on main combustion chamber operating temperature.

A spark igniter 44 may be provided in the modified main combustion chamber 18, which preferably will be directly threaded to the heat retainer 20 to maximize the initial heating of the latter during cold start of the engine when the spark igniter would be used for igniting each charge of the main combustion chamber 18.

By utilizing all or some of the inventive improvements to modify existing prior art legacy engine combustion chambers, disadvantages or the existing engines may be overcome and operating efficiencies improved while undesired emissions are decreased and performance is improved. Research suggests that using the improvements of the inventive concept, the engine power may be improved on the order of 20% and running speed for the power obtained may be reduced on the order of 100 RPM, while improving emissions of CO, NOx and unburned HC. Control over timing of ignition of each combustion cycle also is better achieved using the inventive concepts. By rendering the timing of PFP and the value of PFP from combustion cycle to combustion cycle, the engine will operate more uniformly with less cyclic irregularity, thereby offering the possibility of using the engine for electrical power generation which requires cycle regularity for optimum electrical power generation. Most significantly, all the improvements may be obtained in a simplified manner involving only modification of the head area of the existing engines, thereby avoid costly and lengthy tear down and rebuilding of the main engine block and contained components.

Figure 6:
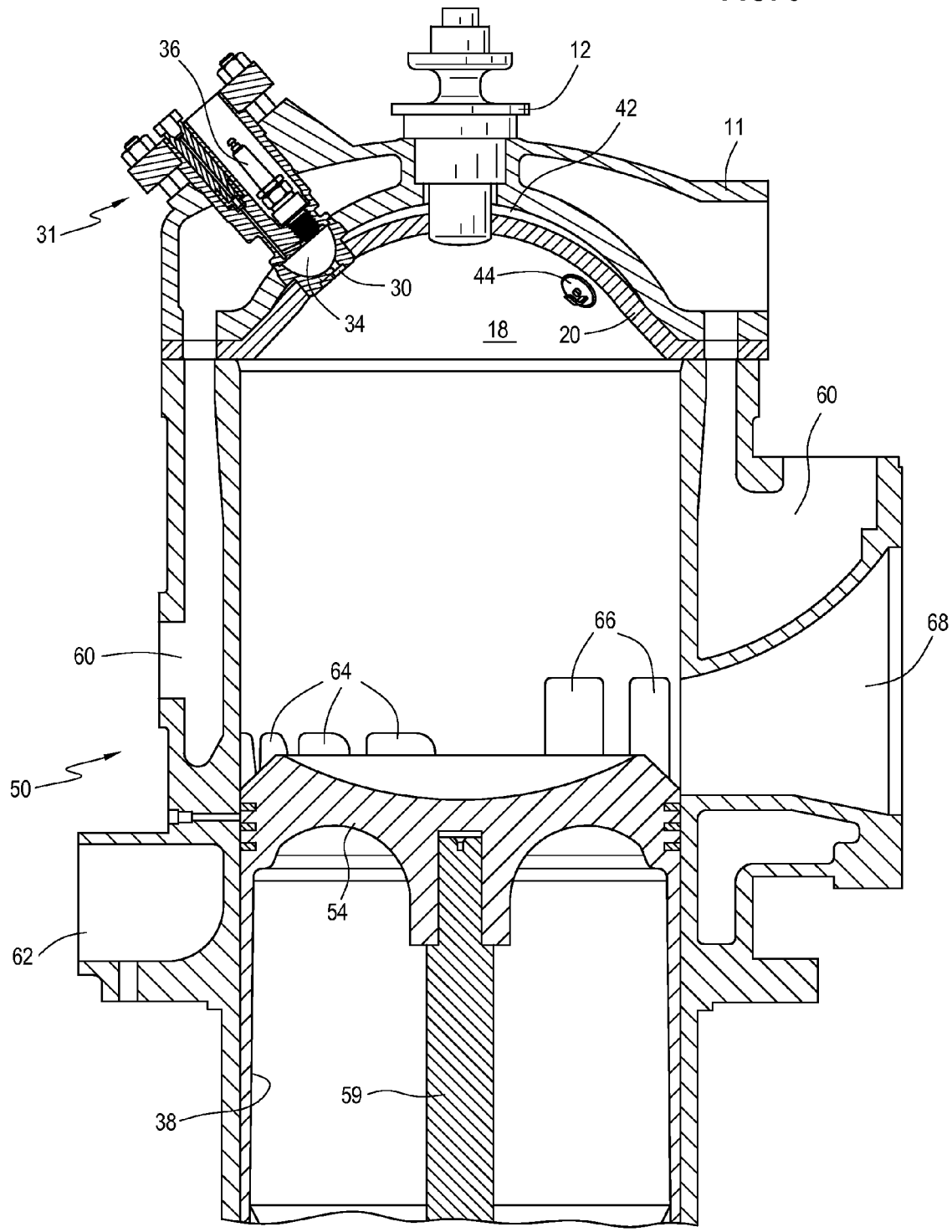
FIG. 6 is a schematic vertical cross-section view of a combustion chamber of another exemplary two-stroke, direct injected, water-cooled, natural gas lean-burning, reciprocating piston engine having installed therein an embodiment of a heat retainer.

With reference to the embodiment shown in FIG. 6, a representative or exemplary engine block 50 is shown in vertical cross-section to expose a main combustion chamber 18 lying between a reciprocating piston 54 and a head 16. The piston 54 reciprocates in a cylinder 58 in the block 50, and in a typical engine, a plurality of such pistons and cylinders will be provided within the block. The piston is connected by a connecting rod 59 to an output crankshaft (not shown) and both the block 50 and head 16 of the engine are typically liquid cooled, the coolant circulating through coolant passages 60 in the head 16 and block 50.

The engine represented in the drawing is a two-cycle engine, with air supplied via an air inlet 62 communicating with inlet ports 64 and exhaust discharged via exhaust ports 66 communicating with exhaust outlet 68 in a conventional manner, such engines being typical and known to internal combustion engine designers.

Fuel for each combustion charge, in this example, a gaseous fuel such as natural gas, is supplied by direct injection via fuel injector 12 in timed relationship with each compression event in the main combustion chamber 18, so that at ignition of the charge the appropriate air/fuel ration is established for proper ignition and combustion in a conventional manner.

For ignition, both a spark igniter 44 and a precombustion chamber igniter 31 may be used, with the precombustion chamber including a precombustion chamber proper 34 to which a rich mixture of air/fuel precombustion charge is supplied (not shown), and in which the precombustion charge is ignited by a precombustion spark igniter 36. Upon ignition of the precombustion charge in timed relationship with the intended combustion event in the main combustion chamber 18, a high energy jet of ignited precombustion charge is discharged in a jet stream through one or more precombustion chamber outlet orifices 30 that provide communication between the precombustion chamber proper 34 and the main combustion chamber 18. The high energy jet of flame or partially combusted radicals of fuel is used to ignite the main charge in the main combustion chamber in a conventional manner. The spark igniter 44 (see detail in FIG. 7) in such an engine may be used to ignite each charge during start-up of a cold engine, or may be used under operating conditions requiring such ignition or combustion enhancement. In addition as previously described, the precombustion chamber may be omitted.

In summary, the motion of the piston after start-up rotation of the engine crankshaft (not shown) forces air into the main combustion chamber 18 via the inlet ports 64, which air may be pressurized (turbocharged or supercharged), or naturally aspirated or circulated, and gaseous fuel is injected directly into the main combustion chamber 18 via the fuel injector 12. The precombustion chamber 34 receives precombustion charge of air and fuel and ignites same by a precombustion spark igniter to produce a hot, highly energetic jet of gas aimed at the main combustion chamber which in turn ignites the charge now in the main combustion chamber 18 in timed relationship with the intended combustion cycle of the engine. Coolant circulates through the block 50 and head 16 to control the temperature of the structures and inherently the temperature of the main combustion chamber to varying degrees, depending on the location being considered within the combustion chamber.

A regenerative heat retainer 20 is disposed in the head 16 of the engine between the head proper and the piston below, so that the main combustion chamber 18 now is defined by the volume between the heat retainer 20, the piston 54 and the cylinder 58. The heat retainer is configured to essentially conform in shape to the original head area of the main combustion chamber, but with a selected gap 42 between the heat retainer 20 and the liquid cooled head 16. The heat retainer is also configured to preserve the original compression ratio of the engine, although the engine designer could alter the compression ratio using the heat retainer if desired, simply by increasing or reducing the volume of the main combustion chamber by altering the size of the heat retainer 20.

Figure 8A:
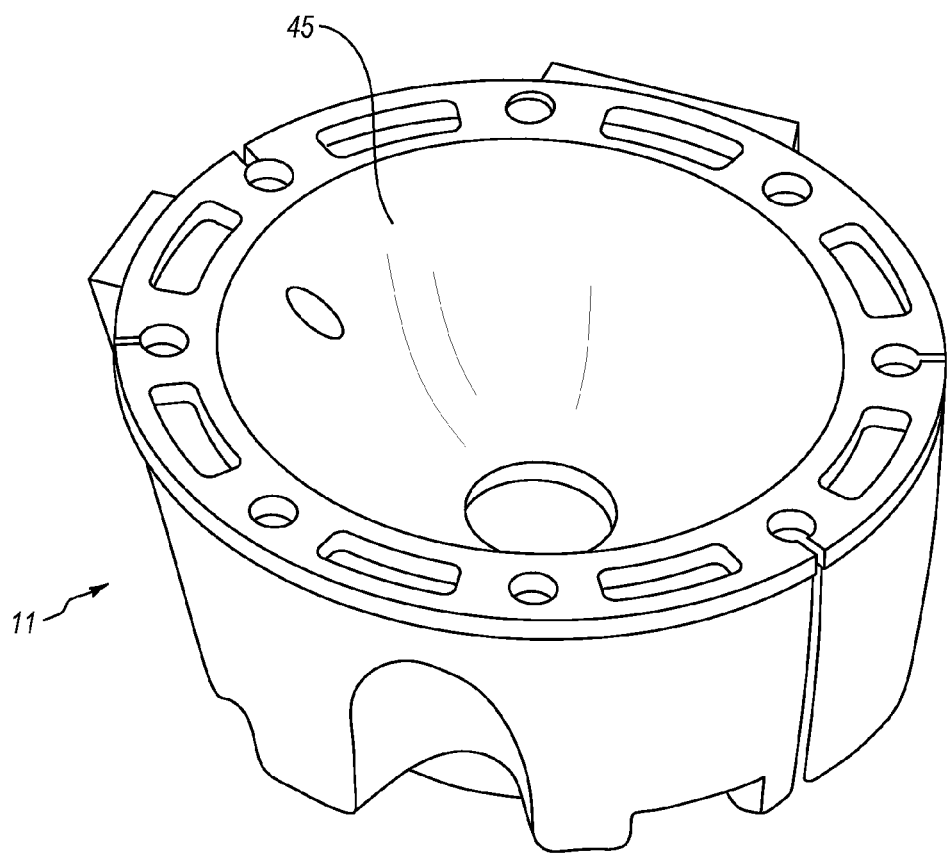
FIGS. 8a and 8b show an embodiment of a shape of a head-facing portion of a heat retainer corresponding to a shape of a portion of the head facing the main combustion chamber.
Figure 8B:
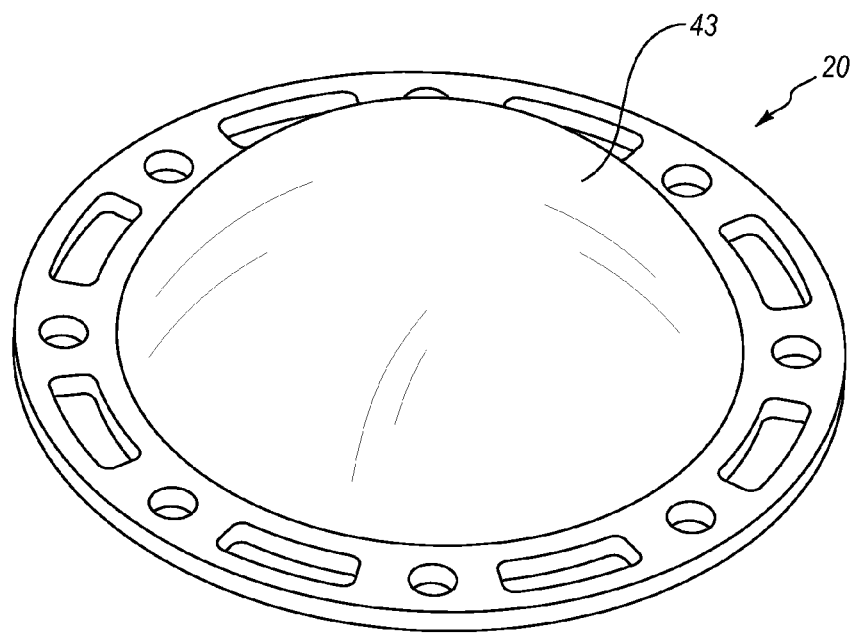

The heat retainer is installed in the head as a self-supporting structure having a head-facing portion 43 having a shape substantially corresponding to the shape of that portion 45 of the main combustion chamber defined by the head with a clearance gap between at least the head-facing portion and the head before engine operation, as shown in the overturned head 16 showing the portion 45 of the head-facing the main combustion chamber in FIG. 8a and the heating retainer 20 having head-facing portion 43 in FIG. 8b.

The material and thermal properties of the head will be taken into account in designing the heat retainer 20, and the following considerations will be evaluated or implemented when designing and installing the heat retainer 20.

It will be assumed that the head 16 possesses a known head thermal diffusivity, head thermal capacity and head heat transfer coefficient, all thermal properties that may be calculated or derived from known information and data, depending on the material of the head. On the basis of such head thermal properties, the regenerative heat retainer will be configured to have a lower heat retainer thermal diffusivity than the head thermal diffusivity, a heat retainer heat capacity greater than the head heat capacity, and a heat retainer heat transfer coefficient lower than the head heat transfer coefficient.

This will result in retention of heat of combustion within the main combustion chamber in which the heat retainer is installed to a greater extent than occurred in the unmodified main combustion chamber. With the gap 42 provided between the heat retainer 20 and the head 16, the modified main combustion chamber with the heat retainer also will be thermally stratified between the lower and upper parts of the combustion chamber, with the relatively cooler part of the combustion chamber located at the lower part thereof, and the hotter part near the top area thereof. This feature enables the engine designer to take into account the ignition and combustion properties of the air/fuel charge in the main combustion chamber, the direction of the precombustion jet discharged from the precombustion chamber and other effects that may be desirable towards enhancing the efficiency of combustion of the engine or uniformity of the peak firing pressures over sequential combustion cycles. The gap 42 is varied as a function of operating temperature within the main combustion chamber 18 due to the expansion and contraction of the heat retainer 20, thereby providing another control function over the operating temperature of the main combustion chamber 18. When the gap 42 is zero, of course, the liquid cooled head 16 contacts the heat retainer at its upper end and cools the heat retainer in that area, resulting eventually in contraction of the heat retainer to reopen the gap 42, with the cycle repeating depending on operating conditions of the engine.

Although the heat retainer is described herein as provided with a water-cooled head, it is not limited to use with a water-cooled head, but may be provided in an engine including engines cooled by other liquids or an air-cooled head, or a head cooled by other various mechanisms or even with uncooled engines.

Figure 9:
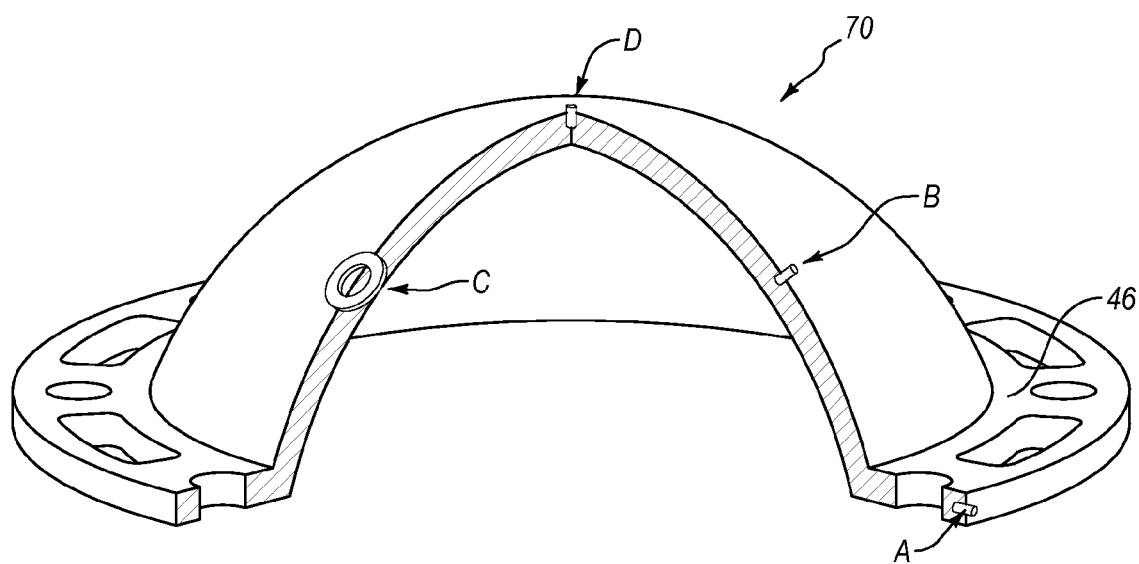
FIG. 9 shows an example of a thermally stratified regenerative combustion chamber.

The heat retainer in the afore described configurations creates what may be termed a "thermally stratified regenerative combustion chamber" in the sense that the heat retainer transmits or conducts heat of combustion from each combustion cycle into the engine block and head in different manners and rates. As shown in FIG. 9, lower temperatures occur near the intersection of the head and block of the engine, or near the lower part of the combustion chamber, for example, at position A on flange 46 of heat retainer 20. Higher temperatures occurring at the mid and top part of the heat retainer 20 may be spaced from the cooled head of the engine, at least until the heat retainer has expanded into contact with the head, at which point the separation gap would be zero. The mid, for example, at position B and top part of the combustion chamber at position D thus function at a higher temperature than the lower part of the combustion chamber. The engine designer is thereby provided with a design tool to adjust the operating temperature of the combustion chamber to influence the characteristics of the lean-burn by designing the heat retaining element, including the material constituting the heat retaining element, and the gap in a manner that can produce a customized thermally stratified regenerative combustion chamber which will be useful to control lean-burn combustion events within the combustion cycle of the engine.

In the engine, a spark igniter 44 may be provided in each main combustion chamber as afore described preferably connected directly to the heat retainer. For example, as shown in FIG. 9, spark igniter 44 may be positioned at position C.

In one example during operation of a natural gas fuel burning internal combustion engine, thermocouples were placed at positions A, B, C, and D, as shown in FIG. 9. During operation, the thermocouples measured a temperature of 103° C. at position A, 294° C. at position B, 229° C. at position C, and 210° at position D.

The engine contemplated, moreover, will be a reciprocating piston, water-cooled, two-stroke, direct injected, natural gas fuel lean burning engine that normally includes at the head of the engine adjacent each main combustion chamber a precombustion chamber 34 having a volume, the precombustion chamber being arranged to receive in the volume a charge of secondary air/fuel during each combustion cycle of the engine, a spark igniter in the precombustion chamber arranged to be cyclically ignited in timed relationship with the combustion cycle of the engine. The precombustion chamber will communicate with a respective main combustion chamber via one or more jet orifices or ports 30 through which a burning flame jet of secondary charge ignited by the spark igniter or high energy radicals resulting from partial combustion of the secondary charge in the precombustion chamber is periodically discharged into the main charge that has been or is being compressed each combustion cycle of the engine to ignite each main lean charge in the main combustion chamber.

The engine as modified or constructed in accordance with the embodiments described herein will run with lower exhaust gas NOx, lower rate of misfire, lower fuel consumption, lower coefficient of variation (COV) of the location of Peak Firing Pressure over the operating range of the engine, lower COV Indicated Mean Effective Pressure (IMEP) over the operating range of the engine. The better control and utilization over thermal transfer of heat of combustion by the thermally stratified regenerative combustion chamber results in the above characteristics of such an engine.

Figure 7:
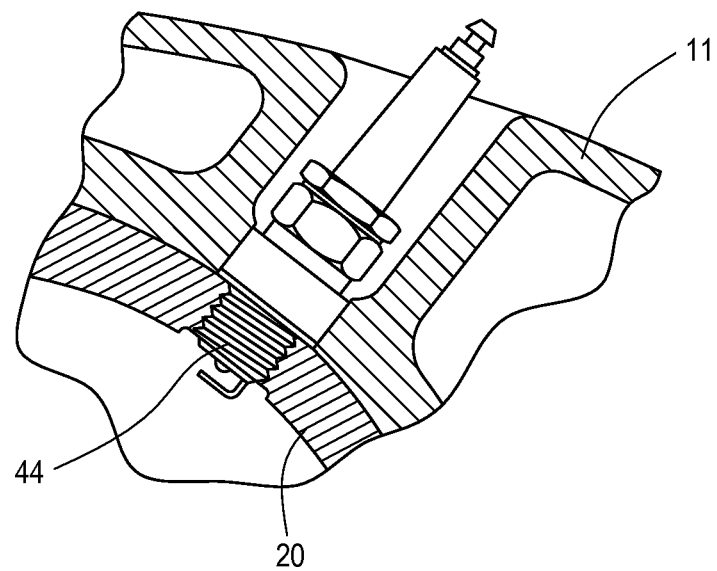
FIG. 7 is a detail view of a spark igniter directly connected to the heat retainer.

In an exemplary engine, the head 16 could be made of cast iron and the regenerative heat retainer 20 could be made of a self-supporting machined or otherwise shaped steel, with the spark igniter 44, for example, threaded directly into the heat retainer 20 as shown in the detail of FIG. 7. The fuel injector 12 likewise could be directly threaded to the heat retainer 20 as shown in FIG. 6. The heat retainer 20 would be sealed against leakage by direct metal-to-metal contact or by appropriate gasket material as needed. The thickness of the heat retainer 20 would be determined by appropriate calculation and iteratively based on the materials of the head 16 and heat retainer 20, as well as the combustion chamber operating conditions, fuel used in the charges and other relevant parameters for any given engine so that the thermal diffusivities, heat capacities, heat transfer coefficients of the head 16 and heat retainer 20 would be matched to achieve the purposes set forth above.

Although heat retainer 20 may be made of machined or otherwise shaped steel, as described above, heat retainer 20 may also be made of various steel or steels, or other metals, alloys, or materials, either machined, cast, shaped, or otherwise formed. For example, heat retainer 20 may be made of aluminum or an aluminum alloy, titanium, a magnesium alloy, or an alloy including at least one of chromium, nickel, iron, molybdenum, cobalt, or tungsten.

The embodiments described herein have particular advantages when applied to a two-stroke, reciprocating piston, natural gas lean-burning, integrated engine-compressor as exemplified by legacy Cooper-Bessemer engines (e.g., Cooper-Bessemer Type GMV Integral-Angle Gas Engine-Compressor) that compress and pump natural gas from gas fields or storage units through gas transmission lines to other storage stations or end users. Such engines make substantial horsepower while operating at relatively low RPM on the order of 300-500 RPM and compression ratios of 4-8 to one. These so called "legacy" engines are notorious for difficult starting and stable running when cold started, run with peak firing pressure variation that is less than desirable, suffer from bearing wear due to such operating characteristics, poor ignition resulting from uneven charge mixture variations and heating, and undesirable NOx and CO emissions. These engines use a precombustion chamber with igniter and hot burning jets discharged from the precombustion chambers to ignite each charge, without assistance from a spark igniter in the main combustion chamber after start-up.

Although various embodiments and examples disclosed herein describe heat retainer 20 being used in a natural gas fuel burning engine, heat retainer 20 is not limited to natural gas fuel burning engines, but may also be used in engines using other gaseous fuels, including, but not limited to, natural gases having various amounts of methane, high-methane natural gas, ethane, propane, or any mixture of these or other gaseous fuels. Further, heat retainer 20 may be implemented in other engines fueled by other forms of fuel, such as liquid fuels, including, but not limited to, gasoline, kerosene, diesel fuel, JetA, JP4, JP5, JP8, JP10, methanol, ethanol, or any mixture of these or other liquid fuels.

Another advantage of the described embodiments is the promotion of Enhanced Radical Ignition (ERI). ERI is a combination of two concepts: radical ignition (RI) assisted by a regenerative heat retaining element (RHRE), the heat retaining element acting as an in-cylinder heat source required to enable auto-ignition because of the low compression ratio/temperature inherent in 2-stroke Legacy engines. Without the presence of the high temperature RHRE, it has been shown by simulation that radical species created in a modified PCC (MPCC), fail to fully ignite fuel injected into the combustion chamber and misfire occurs.

The ERI process with NOx producing flame front eliminated is applicable to 2-stroke engines using modified radical producing MPCCs. To eliminate the flame front, ignition must start throughout the combustion chamber in what is sometimes called a "volume mode" of combustion. Accomplishing this at the "cold" starting temperature of the low compression ratios of the Legacy's requires an in-cylinder heat source rather than increased compression ratio. Improved performance, based on RHRE has documented up to a larger bore, for example, a 8.5 inch AJAX® brand DP42 NG engine.

Additionally, improved performance, based on RHRE has been shown with Small Development Engine (SDE), for example, with 2.5 inch bore has also been documented.

Regenerative Heat Retaining Element (RHRE) has also proven useful in state-of-the-art engines, for example, those used in 2-stroke Unmanned Vehicle Engines (UAV) using heavy fuels. RHRE engines have been built and tested yielding exceptionally stability, reduction in emissions and fuel consumption.

In RHRE Legacy engines, after a brief start-up on spark-ignition (or after later refinements with heating elements imbedded within the RHRE), the RHRE retains heat from the previous combustion cycle and serves as the ignition aid to radical species created in the MPCC for fully controlled auto-ignition of NG.

Another factor involved in carrying out NG auto-ignition in 2-stroke engines, known from research and development over many years, is the appreciable carryover of exhaust products from cycle to cycle in these engines. Run-on after ignition cut off is attributed to residual exhaust radical species and residual exhaust thermal energy. Simulation studies in conventional engines show elimination of most of these potential RI species occurs during the exhaust of a 2-stroke combustion cycle. With ERI, MPCCs aid in storage of a fraction of these potential RI species, and enable their reactivation from a state known as frozen equilibrium during compression and aid auto-ignition in the following ignition event.

The remaining carryover species still in the combustion chamber in the next compression cycle also contribute to the ignition process by being reactivated from frozen equilibrium when heated by compression and the RHRE. Thus the essence of the RHRE 2-stroke SI ignition consists of two interrelated processes. The first is retention of heat from the previous combustion cycle and the second is to use of that heat to reactivate key residual chemical species naturally created late in combustion and quenched to frozen equilibrium during expansion of the previous combustion event. Many of these residuals would have been exhausted from the engine as contaminants without the presence of the RHRE. Instead they become part of the ignition process on being reactivated to radical species by the recycled RHRE heat and enable radical assisted spark ignition (RASI). RASI has been observed experimentally and the associated spark ignition energy (SIE) measured to be lower. RASI has been observed while measuring SIE and changing fuel/air ratio, that SIE required falls to zero if the threshold of Radical Ignition (RI) is reached. RASI experiments have measured a 33% reduction in radical assisted spark ignition voltage while a 1% reduction in the baseline caused engine instability.

Figure 10:
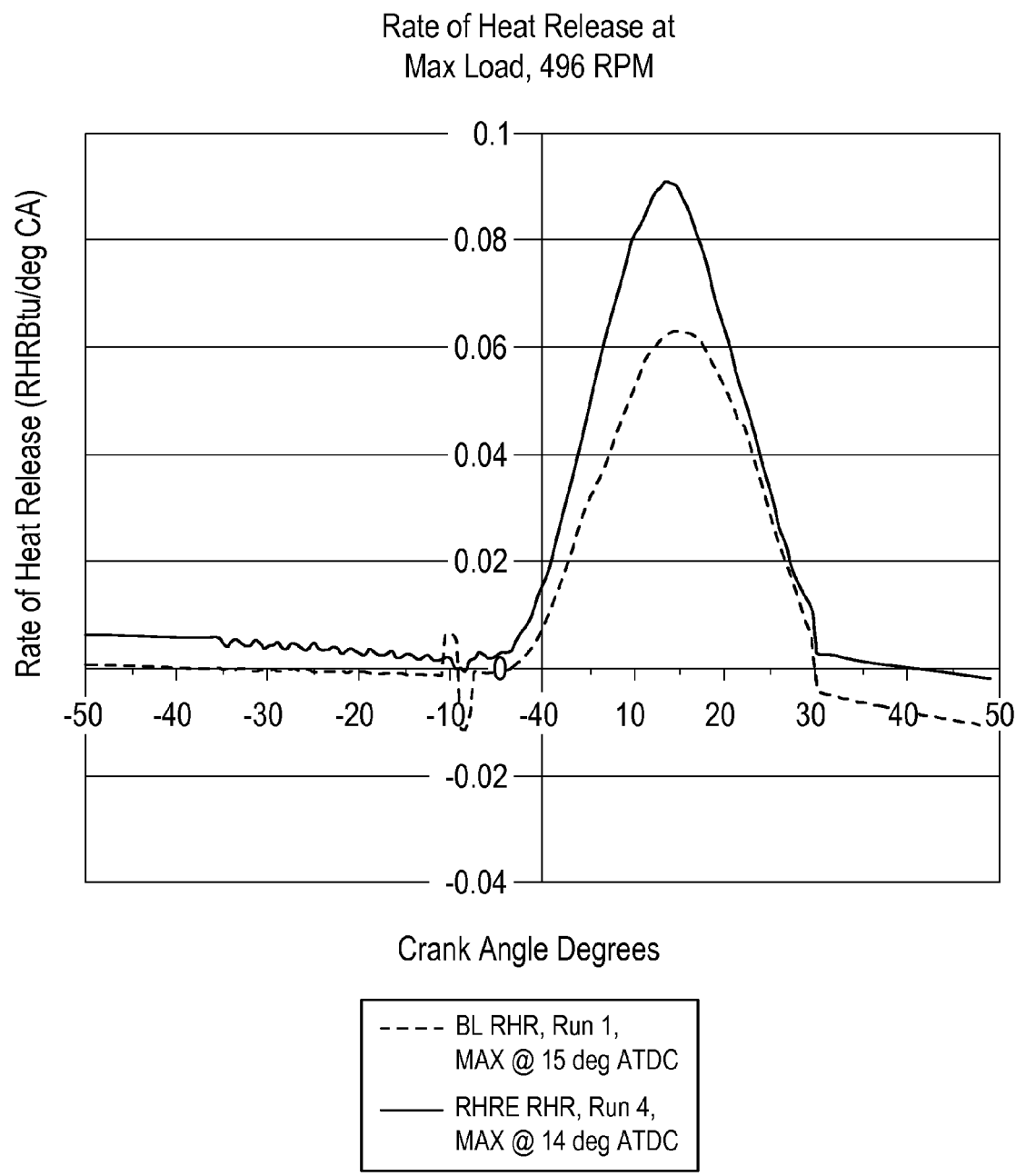
FIG. 10 shows an example of reduced spark ignition energy.

An example of reduced spark ignition energy is shown in FIG. 10, showing a NG test of the AJAX® brand DP42 engine comparing the rate of heat release and spark ignition energy of the RHRE built with the baseline at 496 RPM. The RHRE maximum rate of heat release is 43% greater while its spark ignition energy is 90% lower. Both of these traits define the primary characteristics of the RHRE. As shown in FIG. 10, a significant difference in magnitude of spark discharge, baseline is much greater using the same spark plug.

While turbo chargers are used to increase the pressure of each charge of air/fuel, the increased loading on bearings and piston components and preignition in the combustion chamber, particularly during cold start-up, decreases the operating duty cycle of the engine between maintenance cycles and overhauls, and increases NOx emissions and unburned hydrocarbons in the exhaust stream. The tendency is to operate the engines to avoid these disadvantages by retarding timing of ignition from an optimum timing that could produce best power and economy.

The regenerative heat retainer 20 produces rapid heating of the combustion chamber from a cold start condition of the engine without the need for boosting the air supply by turbocharging, for example, and creates a charge mixture capable of ignition at leaner air/fuel ratios. Extant ignition timing may then be retarded for better power while maintaining a more uniform, consistent peak firing pressure location with reduced NOx emissions. Fuel consumption is further optimized by to the extent that the regenerative heat retainer will enable the engine to operate at lower exhaust CO, NOx for a given power output in view of the above considerations.

The incorporation of a heat regeneration element in the combustion chamber of an AJAX® brand engine has been explored and resulted in a significant reduction in the COV (IMEP) and lowered heat transfer losses when operating on propane. The heat regeneration element is formed to profile the upper portion of the combustion chamber, above the top surface of the piston. As a result, the heat regeneration element, which, in this example was fabricated from a single piece of material, is subjected to the flame of the combustion and attains a high operating temperature. These criteria provide a unique method of heat transfer to the air/fuel mixture to enhance flame kernel development and combustion of the remaining air/fuel mixture to improve COV (IMEP).

The heat regeneration element provides heat transfer to the entire air/fuel mixture, particularly during the compression stroke, which at any instant results in a stratified temperature of the charge. The highest temperature of the air/fuel charge is in the immediate vicinity of the surface of the heat regeneration element facing the air/fuel charge, such as that shown in FIG. 9. This temperature conditioning of the air/fuel charge enhances the flame speed, as a function of the stratified temperature. Advantageously, the highest air/fuel charge temperature is in contact with the spark plug, at position C of FIG. 9.

In lean mixtures, COV (IMEP) is influenced by several factors (i.e., mixture preparation, swirl), a high rate of development of the flame kernel is essential and can be examined by simulation. In short, upon the spark event the kernel can be rapidly developed by the flame front velocity as a function of the initial high air/fuel temperature in the vicinity of the spark plug. This process can be fully simulated based on chemical characterization/lean burn performance of the methane. The rapid development of the flame kernel provides the basis of the stability of the flame front for the remainder of the combustion event and consequential improvement in COV (IMEP).

Combustion of the lean air/fuel charge is achieved at high rates of heat release, as evidenced by the rate of change of cylinder pressure. The high rate of heat release is enabled by the instantaneous air/fuel temperature which is the direct result of heat transfer from the heat retaining element during the compression stroke. For example, characterization of methane for flame speed shows that for an 80° C. increase in temperature over the unmodified, stock engine configuration due to the heat regeneration element the flame speed has been shown to increase by 50%. Therefore, in an unmodified, stock engine where an air/fuel charge has not been conditioned, the overall burn time during the power stroke will be longer (due to lower rates of heat release), which results in higher levels of heat transfer loss to the cylinder wall and head. Increasing the rate of heat release in a controlled method is a very effective aspect for improving the combustion process for methane fuelled engines. In state-of-the-art, high rate of heat release, bi-fuel, diesel combustion technology the heat transferred to the coolant has been shown to be reduced from 19% to 10% and heat transferred to work has been shown to be increased by 14%.

The temperature stratification achieved with the heat regeneration element is particularly advantageous as the highest temperature air/fuel mixture is utilized to stabilize the initial flame kernel. Temperature stratification has not been able to be attained with increased compression ratio or allowing the stock head to overheat. Both of these approaches are undesirable for methane combustion, as they promote uncontrolled compression ignition. In other words, instantaneous temperature stratification is desirable and highly effective.

Test and simulation data indicate that RHRE fundamentally alters the combustion process in-cylinder, improving engine performance on multiple fronts without negative trade-offs. These improvements include, but are not limited to: dramatically reduced emissions, particularly NOx, even while improving engine stability and fuel economy; increased fuel economy without sacrificing power; higher power ratings for engines while complying with emissions standards thus reducing the need for additional capacity; improved lean combustion process eliminating detonations and misfires; reducing engine wear and maintenance costs; reducing or eliminating engine performance problems associated with changing natural gas composition; allowing retrofitting of existing Legacy integral engine population at a much lower cost than replacement (providing emissions than other emission-reducing solutions, significantly improving the long-term savings); and making existing engine designs, which may have been discontinued due to emissions non-compliance, viable again when equipped with RHRE technology.

Still another advantage is that modifying an existing engine to operate with the benefit of the regenerative heat retainer can be accomplished without major modification of the engine head and block elements. Typically, only the head must be modified in some minor respects to accommodate the regenerative heat retainer while preserving the original compression ratio or modifying the compression ratio as desired.

While particular embodiments of a method of modifying and a resulting modified combustion chamber in a reciprocating piston internal combustion engine are discussed above, it is to be understood that not necessarily all objects or advantages may be achieved in accordance with any particular embodiment. Thus, for example, those skilled in the art will recognize that the embodiments and examples may be embodied or carried out in a manner that achieves or optimizes one advantage or group of advantages as taught herein without necessarily achieving other objects or advantages as may be taught or suggested herein.

The skilled artisan will recognize the interchangeability of various disclosed features. In addition to the variations described herein, other known equivalents for each feature can be mixed and matched by one of ordinary skill in this art arrive at the disclosed method or resulting modified engine in accordance with principles of the present disclosure.

Although the method and modified engine described herein are disclosed in the context of certain exemplary embodiments and examples, it therefore will be understood by those skilled in the art that the present disclosure extends beyond the specifically disclosed embodiments to other alternative embodiments and/or uses of the disclosure and obvious modifications and equivalents thereof. Thus, it is intended that the scope of the present disclosure herein disclosed should not be limited by the particular disclosed embodiments described above.

We claim:

1. A method for improving combustion in a main combustion chamber of an internal combustion engine, the engine including a main combustion chamber arranged between a head and a reciprocating piston, the method comprising:
   providing a heat retaining element between the head and the main combustion chamber, the heat retaining element being configured to reduce heat transfer from the main combustion chamber into the engine head; and
   providing a precombustion chamber including a reaction chamber, the reaction chamber being configured to be provided with a secondary charge of air/fuel and a first spark igniter, the reaction chamber communicating with the main combustion chamber via a plurality of discharge channels configured to discharge fuel radical species from the reaction chamber into the main combustion chamber, the fuel radical species being generated from the secondary charge,
   wherein the heat retaining element is a self-supporting structure coupled to the head, the heat retaining element including a head-facing portion substantially corresponding in shape to a portion of the head facing the main combustion chamber, and wherein the heat retaining element is provided such that a gap is formed between the head-facing portion of the heat retaining element and the portion of the head facing the main combustion chamber.

2. The method according to claim 1, further comprising providing an auxiliary heat source separate from a second spark igniter in the head area of the engine, the auxiliary heat source being configured to heat a main charge within the main combustion chamber.

3. The method according to claim 1, wherein the engine is configured to operate at a compression ratio on the order of 4-8 to one and a speed on the order of 300-500 RPM.

4. The method according to claim 1, wherein a second spark igniter is provided to the main combustion chamber.

5. The method according to claim 1, wherein each of the discharge channels is a flame-quenching channel having a length that is 0.9 to 1.6 times the channel diameter.

6. The method according to claim 1, wherein the total combined cross-section area of the discharge channels is 0.02 to 0 0.03 times the volume of the main combustion chamber at minimum volume Vmin.

7. The method according to claim 1, wherein exit edges of each of the discharge channels are sharper than exit edges of a jet orifice of the engine before being improved.

8. The method according to claim 1, wherein the volume of the reaction chamber is 2-3% of the volume of the main combustion chamber at minimum volume Vmin.

9. The method according to claim 1, wherein the discharge channels are provided in an end cap of the reaction chamber that, apart from the channels, closes communication between the reaction chamber and the main combustion chamber.

10. The method according to claim 1, wherein heat transfer between the heat retaining element and a spark igniter is allowed by the spark igniter being directly connected to the heat retaining element.

11. The method according to claim 1,
wherein the size of the gap varies in dependence on a temperature of the heat retaining element, and
wherein a heat transfer rate between the heat retaining element and the head varies in dependence on the size of the gap.

12. The method according to claim 1, wherein the heat retaining element is configured to retain heat produced by combustion of a first combustion cycle and transfer the heat to an incoming charge of a second combustion cycle.

13. The method according to claim 11, wherein the size of the gap is permitted to be reduced to zero to increase the heat transfer rate between the heat retaining element and the head under engine operation conditions that cause high heating of the heat retaining element.

14. The method according to claim 1, wherein the heat retaining element is constructed from a material such that the heat retaining element has a lower thermal diffusivity than the thermal diffusivity of the head, the heat retaining element has a greater heat capacity than the heat capacity of the head, or the heat retaining element has a lower heat transfer coefficient lower than the heat transfer coefficient of the head.

15. The method according to claim 1, wherein the engine is a fluid-cooled, two-stroke, direct injected, natural gas fuel burning engine.

16. An internal combustion engine comprising:
a main combustion chamber arranged between a head and a reciprocating piston;
a heat retaining element provided between the head and the main combustion chamber, the heat retaining element being configured to reduce heat transfer from the main combustion chamber into the engine head; and
a precombustion chamber including a reaction chamber, the reaction chamber being configured to be provided with a secondary charge of air/fuel and a first spark igniter, the reaction chamber communicating with the main combustion chamber via a plurality of discharge channels configured to discharge fuel radical species from the reaction chamber into the main combustion chamber, the fuel radical species being generated from the secondary charge,
wherein the heat retaining element is a self-supporting structure coupled to the head, the heat retaining element including a head-facing portion substantially corresponding in shape to a portion of the head facing the main combustion chamber, and
wherein the heat retaining element is provided such that a gap is formed between the head-facing portion of the heat retaining element and the portion of the head facing the main combustion chamber.

17. The engine according to claim 16, wherein the engine is a fluid-cooled, two-stroke, direct injected, natural gas fuel burning engine.

18. The method according to claim 1, wherein the size of the gap varies in dependence on a temperature of the heat retaining element.

19. The method according to claim 1, wherein the size of the gap is permitted to be reduced to zero to increase the heat transfer rate between the heat retaining element and the head under engine operation conditions that cause high heating of the heat retaining element.

20. The engine according to claim 16, wherein the size of the gap varies in dependence on a temperature of the heat retaining element, and
wherein a heat transfer rate between the heat retaining element and the head varies in dependence on the size of the gap.

* * * * *